US012613879B2

(12) United States Patent
Barrett et al.

(10) Patent No.: US 12,613,879 B2
(45) Date of Patent: Apr. 28, 2026

(54) ARTIFICIAL-INTELLIGENCE-INTEGRATED GLOSSARY ENGINE IN A GLOSSARY SYSTEM

(71) Applicant: Microsoft Technology Licensing, LLC, Redmond, WA (US)

(72) Inventors: Christopher Walker Barrett, New York, NY (US); Jack Micle Pullikottil, Redmond, WA (US); Vishnu Sivadasan, Kirkland, WA (US); Hardi Hasmukh Rathod, Maharashtra (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/884,908

(22) Filed: Sep. 13, 2024

(65) Prior Publication Data

US 2026/0079952 A1 Mar. 19, 2026

(51) Int. Cl.
*G06F 16/248* (2019.01)

(52) U.S. Cl.
CPC .................................. *G06F 16/248* (2019.01)

(58) Field of Classification Search
None
See application file for complete search history.

(56) References Cited

U.S. PATENT DOCUMENTS

| | | | | |
|---|---|---|---|---|
| 8,014,997 B2 * | 9/2011 | Huang | ................ | G06F 16/3338 704/7 |
| 9,785,715 B1 * | 10/2017 | Busey | .................... | G06Q 50/01 |
| 11,322,144 B2 * | 5/2022 | Maeng | .................... | G06F 40/35 |

(Continued)

FOREIGN PATENT DOCUMENTS

CN 117454985 A 1/2024

OTHER PUBLICATIONS

Matching Table Metadata with Business Glossaries Using Large Language Models (Year: 2023).*

(Continued)

*Primary Examiner* — Kim T Nguyen
(74) *Attorney, Agent, or Firm* — Shook, Hardy & Bacon L.L.P.

(57) ABSTRACT

Methods, systems, and computer storage media for providing glossary management using an artificial intelligence (AI)-integrated glossary engine in a glossary system are described. The AI-integrated glossary engine recommends definitions for terms and phrases associated with a query. In operation, the AI-integrated glossary engine identifies domain-specific glossary terms, which are terms or phrases (e.g., jargon) with a client-specific definition associated with several sources. A user can provide a query to an AI agent to generate a response, and the AI-integrated glossary engine, utilizing a machine learning model, retrieves domain-specific glossary terms that are unique to the domain in question and responsive to the query. In this way, through continuous curation and version control mechanisms, such as generating glossary-refinements, the glossary system evolves and stays up to date with domain-specific glossary terms with definitions that provide proper denotation and connotation of domain-specific glossary terms, ensuring that responses to queries are contextually correct.

20 Claims, 9 Drawing Sheets

(56) References Cited

U.S. PATENT DOCUMENTS

| | | | |
|---|---|---|---|
| 11,734,507 B1 * | 8/2023 | Scott | G06F 40/284 |
| | | | 715/208 |
| 11,921,710 B2 * | 3/2024 | Gylfason | G06F 16/2425 |
| 12,007,939 B1 * | 6/2024 | Osofsky | G06F 16/951 |
| 12,470,405 B2 * | 11/2025 | Salem | H04L 9/3265 |
| 12,477,449 B2 * | 11/2025 | Jayaram | H04W 8/18 |
| 2002/0052860 A1 * | 5/2002 | Geshwind | G09B 7/02 |
| | | | 706/62 |
| 2005/0065773 A1 * | 3/2005 | Huang | G06F 40/242 |
| | | | 704/7 |
| 2005/0065774 A1 * | 3/2005 | Doganata | G06F 16/31 |
| | | | 704/7 |
| 2015/0286697 A1 * | 10/2015 | Byrne | G06Q 50/01 |
| | | | 707/600 |
| 2020/0118010 A1 | 4/2020 | Lee | |
| 2021/0065703 A1 * | 3/2021 | Maeng | G10L 13/00 |
| 2022/0245140 A1 * | 8/2022 | Gylfason | G06F 16/252 |
| 2022/0335307 A1 | 10/2022 | Wang | |
| 2024/0086793 A1 | 3/2024 | Brown | |
| 2024/0104480 A1 | 3/2024 | Chevuru | |
| 2024/0111795 A1 | 4/2024 | Ogden | |
| 2024/0241982 A1 * | 7/2024 | Gordon | G06F 21/6227 |
| 2025/0147485 A1 * | 5/2025 | Hegde | G05B 19/4099 |

OTHER PUBLICATIONS

A Learning-Based Approach for Automatic Construction of Domain Glossary from Source Code and Documentation (Year: 2019).*

* cited by examiner

INTERNET SOURCES 122

LOCALLY STORED DICTIONARIES 124

GLOSSARY REFINEMENT ENGINE 160

AI AGENT 172

ARTIFICIAL INTELLIGENCE MACHINE LEARNING MODEL 170

AI-INTEGRATED GLOSSARY CURATOR CLIENT 192

GLOSSARY SERVICE 160

AI-INTEGRATED GLOSSARY 140

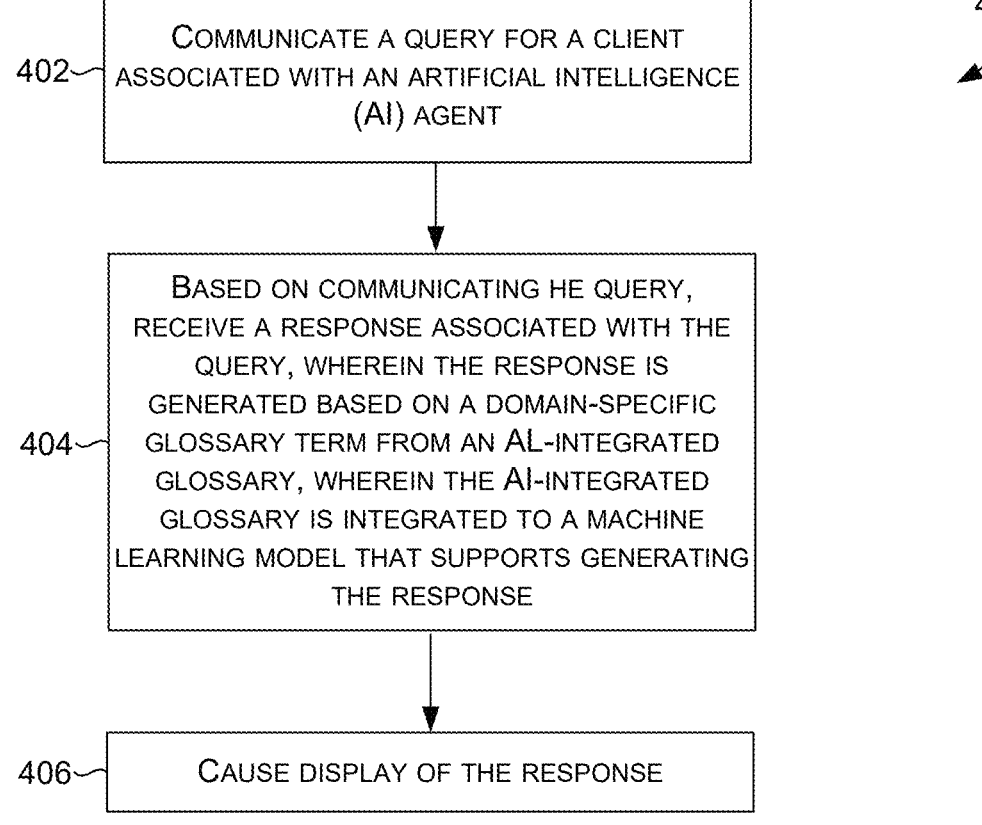

402 — COMMUNICATE A QUERY FOR A CLIENT ASSOCIATED WITH AN ARTIFICIAL INTELLIGENCE (AI) AGENT

404 — BASED ON COMMUNICATING HE QUERY, RECEIVE A RESPONSE ASSOCIATED WITH THE QUERY, WHEREIN THE RESPONSE IS GENERATED BASED ON A DOMAIN-SPECIFIC GLOSSARY TERM FROM AN AL-INTEGRATED GLOSSARY, WHEREIN THE AI-INTEGRATED GLOSSARY IS INTEGRATED TO A MACHINE LEARNING MODEL THAT SUPPORTS GENERATING THE RESPONSE

406 — CAUSE DISPLAY OF THE RESPONSE

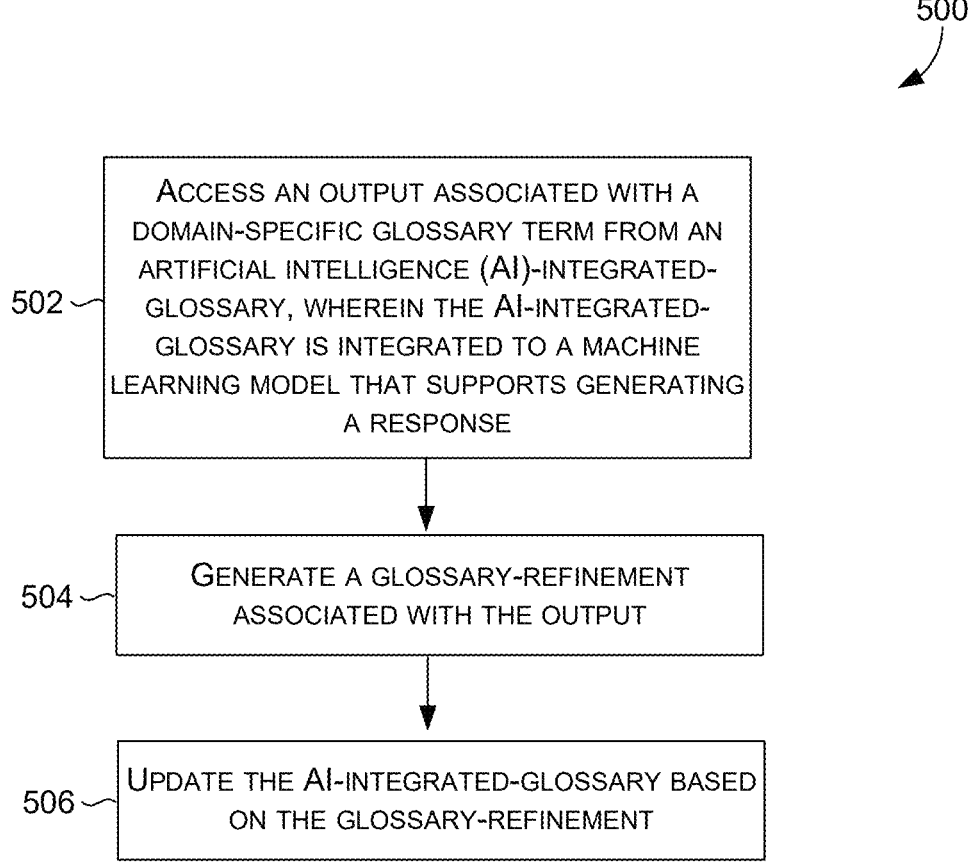

500

502 — ACCESS AN OUTPUT ASSOCIATED WITH A DOMAIN-SPECIFIC GLOSSARY TERM FROM AN ARTIFICIAL INTELLIGENCE (AI)-INTEGRATED-GLOSSARY, WHEREIN THE AI-INTEGRATED-GLOSSARY IS INTEGRATED TO A MACHINE LEARNING MODEL THAT SUPPORTS GENERATING A RESPONSE

504 — GENERATE A GLOSSARY-REFINEMENT ASSOCIATED WITH THE OUTPUT

506 — UPDATE THE AI-INTEGRATED-GLOSSARY BASED ON THE GLOSSARY-REFINEMENT

ARTIFICIAL INTELLIGENCE (AI) SYSTEM
600A

COMPUTING SYSTEM
610

COMPUTING ENGINE
620

COMPUTING RESOURCES
630

MACHINE LEARNING ENGINE
640

MACHINE LEARNING DATA
642

MACHINE LEARNING
MODELS
644

NETWORK
600B

COMPUTING CLIENT
650

COMPUTING ENVIRONMENT
660

700

CLIENT DEVICE
780

FABRIC
CONTROLLER
740

HOST
750

VIRTUAL
MACHINE
752

VIRTUAL
MACHINE
754

NODE 730

RESOURCES
760

RACK 720

CLOUD COMPUTING PLATFORM 710

800

MEMORY

812

PROCESSOR(S)

814

PRESENTATION
COMPONENT(S)

816

810

I/O PORT(S)

818

I/O COMPONENTS

820

POWER SUPPLY

822

ARTIFICIAL-INTELLIGENCE-INTEGRATED GLOSSARY ENGINE IN A GLOSSARY SYSTEM

BACKGROUND

Users rely on glossaries to identify and clarify terms that may be ambiguous when trying to accomplish written and spoken tasks. A glossary system operates as a repository and as a point of access to glossary data. In particular, the glossary system may function as a centralized glossary service where all glossary terms and their definitions are stored and managed. For example, users and other system components can interact with the centralized glossary service through defined interfaces and Application Programming Interfaces (APIs) to retrieve specific terms and their definitions as needed. A glossary service can provide functionalities such as storing, updating, querying, and distributing glossary information to other components in the glossary system. A glossary system can rearrange and redefine text, and can correctly define terms and phrases, including appropriate denotation and connotation, without explicit instructions.

SUMMARY

Various aspects of the technology described herein are generally directed to systems, methods, and computer storage media for, among other things, providing glossary management using an AI-integrated glossary engine in a glossary system. A glossary system provides glossary terms and their respective definitions for generating responses to queries. Glossary management is a systematic approach to identifying, curating, and standardizing terminology, ensuring consistency and clarity across all entries of terms and phrases. Glossary management further includes performing AI-integrated operations via the AI-integrated glossary engine. The AI-integrated glossary engine supports recommending definitions for terms and phrases associated with a query. In particular, the AI-integrated glossary engine identifies and utilizes domain-specific glossary terms that are specific to a particular field, industry, or area of knowledge to perform AI-related tasks. For example, a domain-specific glossary term is a term or phrase with a client-specific definition (e.g., capturing the jargon used internally by a client). A user can provide a query to an AI agent to generate a response and the AI-integrated glossary engine, utilizing an AI machine learning model, identifies and utilizes domain-specific glossary terms that are unique to the domain in question to generate a response to the query. Moreover, through continuous curation and version control mechanisms, such as generating glossary-refinements, the glossary system evolves and stays up to date with domain-specific glossary terms with definitions that provide proper denotation and connotation of the domain-specific glossary terms, ensuring that AI-generated responses to queries are contextually correct.

The AI-integrated glossary engine can refer to a component that supports generating AI-based responses using domain-specific glossary terms (i.e., terms with contextually accurate descriptions) based on AI-integrated glossary engine resources (e.g., internet sources, locally stored dictionaries, domain-specific glossary terms data sources, etc.). The AI-integrated glossary engine includes and employs different components and techniques to identify, retrieve, and communicate domain-specific glossary terms and phrases, as well as the respective definitions of the terms and phrases, in AI-generated responses to queries. In particular, integration with AI (i.e., a machine learning model or an AI-based productivity assistant) allows for generation and communication of terms and/or phrases with contextually correct definitions. The glossary engine scans internal documents periodically to identify potential terms and their associated terms for indexing and inclusion in a database (e.g., lookup).

Conventionally, AI systems (e.g., artificial intelligence agents used to process queries) are not configured with a comprehensive computing logic and infrastructure to efficiently and effectively respond to queries with domain-specific glossary terms having accurate (e.g., internal client) context. For example, using an AI system to generate responses to queries can be challenging because AI agents typically utilize the common definition of a term as it is used outside of an organization instead of the meaning of the term as it is used inside of the organization. Generating contextually relevant responses can be challenging for an AI-based system, because typical AI agents use large language models (LLMs), which are often trained on common language, to respond to queries requiring contextual information beyond common language.

Moreover, conventional glossary systems can be limited in that these glossary systems simply map definitions to terms. While mapping domain-specific definitions to terms can provide a structured approach to utilizing contextually correct terminology, these definitions are often manually curated and also have limitations in terms of flexibility, context sensitivity, longevity, updateability, and scalability. Additionally, the glossary systems are not adequately integrated with AI systems to support generating responses based on domain-specific glossary terms.

A technical solution—to the limitations of conventional AI systems and glossary systems—can include providing AI-integrated glossary resources via an AI system that supports glossary management in a glossary system. The AI-integrated glossary resources can include machine learning (i.e., LLM) generated terms and respective term descriptions (i.e., definitions) for terms from internet sources, locally stored dictionaries, and domain-specific glossary terms data sources (e.g., documents associated with an organizations assets and/or procedures). The AI-integrated glossary resources can operate with an AI-integrated glossary engine, an AI-integrated glossary, a machine learning model (e.g., an AI-based productivity assistant) a glossary service, and a glossary-refinement engine that facilitates feedback-based automated refinements (e.g., glossary-refinements). The AI-integrated glossary resources can further include a curator client that supports providing definitions and refining domain-specific glossary terms that are associated with AI-integrated glossary engine, and the glossary-refinements can be stored in the glossary system for future reference. A human subject matter expert has the option to verify the glossary term and its definition identified by AI, ensuring the accuracy and validity of definitions.

In operation, in a first embodiment, a query from an AI agent is accessed. The query is processed to generate to a response. Based on processing the query, a domain-specific glossary term is retrieved from an AI-integrated glossary. The AI-integrated-glossary is integrated to a machine learning model that supports generating the response. The response is generated based on the domain-specific glossary term. The response is communicated to cause display of the response.

In a second embodiment, a query for a client associated with an AI agent is communicated. Based on communicating the query, a response associated with the query is received. The response is generated based on a domain-specific glossary term from an AI-integrated glossary. The AI-integrated-glossary is integrated to a machine learning model that supports generating the response. The response is caused to be displayed.

In a third embodiment, an output associated with a domain-specific glossary term from an AI-integrated glossary is accessed. The AI-integrated-glossary is integrated to a machine learning model that supports generating a response. A glossary-refinement associated with the output is generated. Based on the glossary-refinement, the AI-integrated glossary is updated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIG. 4 provides a second exemplary method of providing glossary management using an AI-integrated glossary engine, in accordance with aspects of the technology described herein;

FIG. 5 provides a third exemplary method of providing glossary management using an AI-integrated glossary engine, in accordance with aspects of the technology described herein;

DETAILED DESCRIPTION

Overview

Figure 1A:
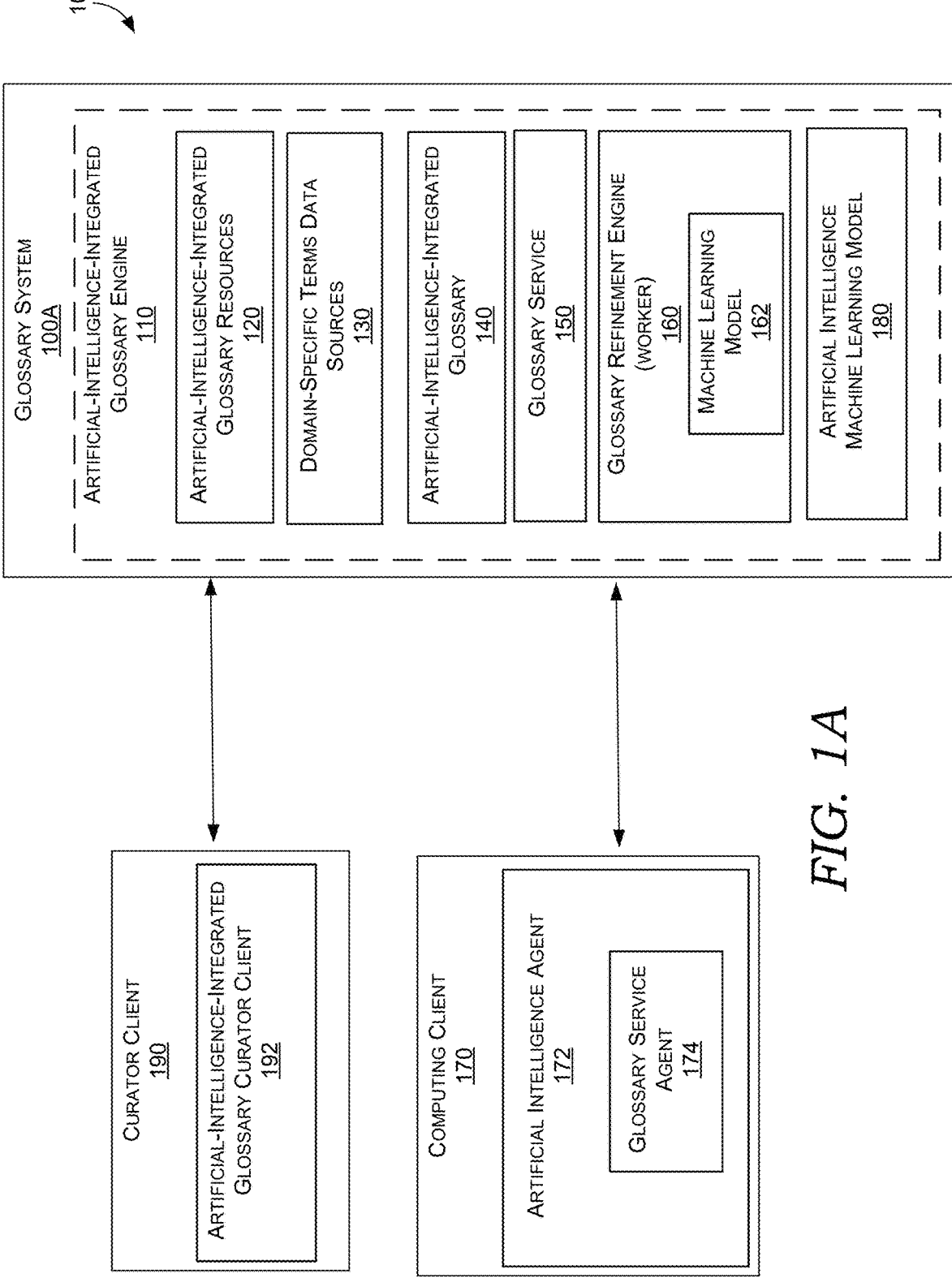
FIG. 1A is a block diagram of an exemplary design system including an AI-integrated glossary engine, in accordance with aspects of the technology described herein.

A glossary system operates as a repository and as a point of access to glossary data. In particular, the glossary system may function as a centralized glossary service where all glossary terms and their definitions are stored and managed. The centralized glossary service can operate as a dedicated component that serves as a primary repository and point of access for glossary data. It functions as a centralized hub where all glossary terms and their definitions are stored and managed. Users and other system components can interact with the centralized glossary service through defined interfaces and Application Programming Interfaces (APIs) to retrieve specific terms and their definitions as needed.

An artificial intelligence (AI) system is a type of AI agent (e.g., such as an AI assistant, including AI assistants like Microsoft COPILOT, IBM Watson Assistant, Salesforce Einstein, OpenAI ChatGPT, Rasa, etc.) that can be deployed in a computing environment to query. By way of illustration, an AI-based digital assistant uses artificial intelligence techniques like natural language processing and machine learning to understand and respond to user queries. When a user submits a question, the assistant processes the language to interpret the intent, retrieves relevant information from its knowledge base or external sources, and generates a coherent, contextually appropriate response in natural language. This enables the assistant to provide accurate and helpful information or perform tasks efficiently, mimicking human-like interaction.

Conventionally, AI systems are not configured with a comprehensive computing logic and infrastructure to efficiently and effectively respond to queries with domain-specific glossary terms having accurate context. For example, using an AI system to generate responses to queries can be challenging because AI agents typically utilize the common definition of a term as it is used outside of an organization instead of the meaning of the term as it is used inside of the organization. While a contextually correct use of a term may properly respond to a query and build consumer trust in the AI agent, a contextually incorrect use of a term may ineffectively respond to a query and consequently destroy consumer trust in the AI agent.

Moreover, conventional glossary systems may simply map definitions to terms. While mapping domain-specific definitions to terms can provide a structured approach to utilizing contextually correct terminology, these definitions are often manually curated and also have limitations in terms of flexibility, context sensitivity, longevity, updateability, and scalability. Additionally, the glossary systems are not adequately integrated with AI systems to support generating responses based on domain-specific glossary terms.

Furthermore, using an AI system or a glossary system—independently of each other—to generate real-time responses to queries with contextually accurate terms can be challenging. For instance, when a system has only a glossary (e.g., one not integrated with AI) the user has to manually find the appropriate word for a document. And, typical AI agents are generally not integrated with a glossary system and simply use large language models (LLMs), which are often trained on common language, to respond to queries requiring contextual information beyond common language. A user has to define or describe specific domain-specific glossary terms in their queries. As such, generating contextual responses can be challenging without an AI-integrated glossary. As such, a more comprehensive AI-integrated glossary system—with an alternative basis for performing glossary management operations—can improve computing operations and interfaces for glossary systems.

Embodiments of the present technical solution are directed to systems, methods, and computer storage media for, among other things, providing glossary management using an AI-integrated glossary engine in a glossary system. A glossary system provides glossary terms and their respective definitions for generating responses to queries. Glossary management is a systematic approach to identifying, curating, and standardizing terminology, ensuring consistency and clarity across all entries of terms and phrases. Glossary management further includes performing AI-integrated operations via the AI-integrated glossary engine.

The AI-integrated glossary engine supports recommending definitions for terms and phrases associated with a query. In particular, the AI-integrated glossary engine identifies and utilizes domain-specific glossary terms that are specific to a particular field, industry, or area of knowledge to perform AI-related tasks. For example, a domain-specific glossary term is a term or phrase with a client-specific definition (e.g., capturing the jargon used internally by a client). A user can provide a query to an AI agent to generate a response and the AI-integrated glossary engine, utilizing an AI machine learning model, identifies and utilizes domain-specific glossary terms that are unique to the domain in question and responsive to the query. Moreover, through continuous curation and version control mechanisms, such as generating glossary-refinements, the glossary system evolves and stays up to date with domain-specific glossary terms with definitions that provide proper denotation and connotation of the domain-specific glossary terms, ensuring that AI-generated responses to queries are contextually correct.

Description of Technical Solution

At a high level, glossary management-using an AI-integrated glossary engine in a glossary system-operates to identify and communicate a domain-specific glossary term with contextually correct denotation and connotation as used internally within an organization. A glossary system is a glossary service that can leverage AI in various ways to provide enhanced functionality and provide users with advanced tools and features to process queries and produce descriptions of terms and phrases based on processing the queries. The glossary system can support providing definitions for domain-specific glossary terms, including appropriate denotation and connotation. The glossary system ensures the consistent and efficient use of domain-specific glossary terms in producing high-quality responses to queries. The glossary system can be a glossary system that leverages AI, such as machine learning models and LLMs, in various ways to provide enhanced functionality and provide users with contextually accurate responses to queries.

In one example embodiment, an AI agent can operate on the client device, initiating the interaction with the user. After receiving a query, the AI agent locally processes the query using techniques like natural language understanding. Then, the AI agent forwards the processed query to a central AI service hosted on a remote server or cloud platform. The AI service is equipped with sophisticated algorithms and machine learning models for generating a response to the query. In particular, for queries associated with domain-specific glossary terms, the AI service makes calls to a glossary service specialized in particular tasks or data sources associated with domain-specific glossary terms in queries. The glossary service complements the AI service by providing necessary input or processing to enhance response generation. Through APIs or web services, the AI service communicates with the secondary service, exchanging information as needed.

Once the AI service has all the required input, the AI service generates a comprehensive response to the user's query. This response is then communicated back to the AI agent on the client device. Finally, the AI agent presents the response to the user in a suitable format, such as spoken language, text, or visual display. This architecture efficiently combines the local intelligence of the AI agent with the advanced capabilities of remote AI services and specialized secondary services, ensuring effective processing of user queries. However, other variations and combinations of architectures, such as on-device or edge AI processing, are possible, depending on specific requirements and constraints. For example, in one embodiment, the AI agent makes calls to the glossary service to identify domain-specific glossary terms in queries, and then communicates the domain-specific glossary terms to the AI machine learning model to generate a response to the query based on the domain-specific glossary terms.

Figure 1B:
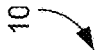
FIG. 1B is glossary management schematics associated with a glossary management workflow of an AI-integrated glossary engine, in accordance with aspects of the technology described herein.

With reference to FIG. 1B, FIG. 1B illustrates a glossary system 100A that provides for generating and refining domain-specific glossary terms in an AI-integrated glossary and further facilitates generating AI-based responses based on domain-specific glossary terms. The glossary system 100A includes an AI-integrated glossary 140 for storing domain-specific glossary terms and related information. The AI-integrated glossary 140 can be designed as a graph database, optimized for storing and querying interconnected data in the form of nodes and edges. AI-integrated glossary 140 efficiently manages the relationships between terms, their attributes, and metadata, enabling fast retrieval and traversal for applications such as semantic search and knowledge discovery.

The AI-integrated glossary 140 can be a knowledge graph that represents interconnected terms within a domain, structured as a network of nodes and edges. Each node corresponds to a specific term and contains a wealth of metadata, including acronyms, synonyms, tags, definitions, and hierarchical information. These attributes enrich our understanding of each term and its relationships within the broader context. Edges between nodes signify relationships such as synonymy, acronym usage, or hierarchical connections. They may also incorporate additional details such as the strength or weight of the relationship and its directionality. This nuanced approach to representing relationships enables a more comprehensive understanding of the connections between terms and their significance within the domain.

AI-integrated glossary 140 can store refinements (e.g., glossary-refinements) to individual terms in the graph and can include additional attributes or metadata that provide more nuanced information about each term. These refinements can be based on responses generated via the AI agent and encompass details such as definitions, descriptions, usage examples, or related resources from the user, as discussed below. Additionally, hierarchical information can be added to indicate broader and narrower concepts, enriching the understanding of each term's place within the domain's taxonomy.

The glossary system 100A can include a glossary refinement engine 160 and a curator client 190 with an AI-integrated glossary client 192 that facilitate managing and organizing AI-integrated glossary 140. The glossary refinement engine 160 and the curator client 190 support accessing and managing domain-specific glossary terms and definitions. The glossary refinement engine 160 searches and processes AI-integrated glossary resources for suitable definitions for a term or phrase (collectively "term"). The glossary refinement engine 160 can include a glossary machine learning model that facilitates identifying domain-specific terms and definitions. For example, the glossary machine learning model can scrape various resources such as internal resources, domain-specific websites, forums, academic papers, and databases.

By examining how terms are used within specific contexts, the glossary machine learning model can distinguish between multiple meanings of ambiguous terms. For instance, it can analyze surrounding words and phrases to understand the intended meaning of "DOB". If most instances of "DOB" are surrounded by words related to birth or age, the model can infer that it likely stands for "date of birth." Conversely, if "DOB" appears in contexts related to construction or engineering terms, it may be interpreted as "depth of beam." This contextual understanding enables the model to accurately identify terms inconsistent with common usage. The terms and the definitions and/or examples associated with those terms are stored in an AI-integrated glossary. The glossary refinement engine 160 further supports additional glossary-refinement functionality described herein.

The AI-integrated glossary client 192 interfaces with an AI-integrated glossary engine 110 and AI-integrated glossary 140, providing users with a feature-rich environment for glossary maintenance. Users can easily browse through existing glossary entries, organized alphabetically or by categories, to gain insights into the current terminology landscape. For users looking to contribute to the glossary, the client provides intuitive tools for adding new terms and definitions. Through a structured form or a rich text editor, users can input detailed descriptions, examples, and relevant metadata to enrich the glossary content. In this way, the client facilitates efficient editing and updating of glossary entries. Users can modify existing terms or definitions, refine descriptions, and make corrections with ease. Version control features ensure that changes are tracked and documented, allowing for transparency and accountability in the glossary management process.

The AI agent 172—that includes a glossary service agent—and glossary-refinement engine 160 can support refining the AI-integrated glossary 140. By way of illustration, upon receiving a response to a query, users have the opportunity to review and evaluate responses that are generated based on domain-specific glossary terms. The AI agent 172 and the glossary service agent facilitate receiving glossary-refinements such as, feedback, suggesting improvements or highlighting features they find particularly beneficial. For example, the user may update a domain-specific glossary term with new terminology to reflect emerging concepts, clarify definitions to ensure understanding and consistency, and removing obsolete terms to maintain relevance.

The glossary service agent collects and transmits the glossary-refinements to the glossary-refinement engine 160. The glossary-refinement engine 160 analyzes the glossary-refinements, identifying areas for enhancement in the AI-integrated glossary engine 110 functionality. Based on the glossary-refinements received, the glossary-refinement engine 160 updates the AI-integrated glossary 140. The glossary-refinements are integrated with the corresponding domain-specific glossary terms in the AI-integrated glossary 140. For example, a glossary-refinement is integrated as a metadata entry associated with the domain-specific glossary term. This integration ensures that subsequent queries can leverage insights from the glossary-refinement, allowing the AI-integrated glossary engine 110 to utilize the most relevant domain-specific glossary terms and even provide personalized recommendations and tailored experiences to users. By continually incorporating glossary-refinements into the AI-integrated glossary, the AI-integrated glossary engine 110 aims to enhance the quality and relevance of the responses it recommends, thereby improving the overall user experience.

The glossary service 150 manages and provides access to the artificial-intelligence-integrated glossary 140. The glossary service 150 can be implemented as an API (Application Programming Interface) that functions as a bridge that enables different clients and services to interact with the artificial-intelligence-integrated glossary 140. This API provides a structured way for integrating the AI-integrated glossary 140—via glossary service 150—with AI machine learning model 180 such that the AI-integrated glossary engine 100 accesses and manages glossary data programmatically to provide functionality described herein. For example, the glossary service 150 may receive a query from an AI Agent 172 via an AI machine learning model 180. The glossary service 150 uses AI-integrated glossary 140 to identify and retrieve a domain-specific glossary term that is relevant to the query. For example, if the query from the AI agent 172 requests information regarding the term "DOB", the glossary service 150 may reference the AI-integrated glossary 140 to identify the term "DOB". While the popular acronym DOB typically means "date of birth," a corporation or company might use DOB to mean "depth of beam" or any other internal, domain-specific meaning.

As such, a term (e.g., such as an acronym) could hold one meaning outside of a corporation, but the corporation may use the same abbreviation within the corporation to mean something else, which underscores why conventional AI agents may lack the internal client context to generate a proper response to a query. For instance, conventional AI agents may utilize the common definition of a term as it is used outside of a corporation instead of the meaning of the term as it is used inside of the corporation. Consequently, conventional AI agents may provide the wrong interpretation of a term, thereby losing the trust of the user. The present disclosure solves this problem by having the AI agent 172 communicate with the AI-integrated glossary engine 110.

In this way, the AI-integrated glossary engine 110 improves the experience of a computing client using an AI agent by enhancing reliability (e.g., the AI agent providing more accurate output) and reducing error rate (e.g., reduced likelihood of data entry errors). To achieve these improvements, the AI-integrated glossary engine 110 aggregates all of the internal, domain-specific information associated with a company in an AI-integrated glossary and uses that information in responding to queries. For example, if the AI-integrated glossary engine 110 finds a domain-specific glossary term associated with a query, then the domain-specific glossary term is provided to the AI machine learning model 180 and the AI agent 172 to generate and cause display of a response to the query. Accordingly, the AI-integrated glossary engine 110 effectively processes and responds to user queries.

In some examples, adding a manual step, a type of UI-interaction model, helps to eliminate ambiguity based on AI-integrated glossary engine 110 results and to ensure that domain-specific glossary terms are defined properly. In some examples, a cluster identification may be created for each draft entry (e.g., the definition given to the term) so that the AI-integrated glossary curator client 192 can review the definition for the term and either approve or refine the definition before it is saved in the AI-integrated glossary 140 for later retrieval. For example, the AI-integrated glossary engine 110 may generate a draft entry with a definition for a term, and the AI-integrated glossary curator client 192

(e.g., experts within a particular field) would either approve or revise the draft entries on a UI of a computing client before the term and its corresponding definition are incorporated into the AI-integrated glossary 140. As such, the AI-integrated glossary curator client 192 may confirm that the information regarding a term is accurate, and the AI-integrated glossary curator client 192 may make edits to the term and its definition as needed.

Alternatively, or in addition to, a feedback loop may be integrated with the AI-integrated glossary curator client 192. For example, if there is a level of ambiguity, wherein the AI-integrated glossary curator client 192 is prompted with different potential meanings and the AI-integrated glossary curator client 192 must determine which one is the more valuable, then that signal can be taken back from the AI-integrated glossary curator client 192 and be incorporated into a knowledge graph structure as a weighting that has influence in the future (e.g., in later user queries). This kind of optimization is possible when it is embedded directly into the AI-integrated glossary engine 110 itself.

Advantageously, the embodiments of the present technical solution include several inventive features (e.g., operations, systems, engines, and components) associated with a glossary system having an AI-integrated glossary engine. The AI-integrated glossary engine 110 supports identifying, curating, and standardizing terminology, and further supports performing AI-integrated operations via the AI-integrated glossary engine. The AI-integrated glossary engine supports recommending definitions for terms and phrases associated with a query. In particular, the AI-integrated glossary engine identifies and utilizes domain-specific glossary terms that are specific to a particular field, industry, or area of knowledge to perform AI-related tasks. A user can provide a query to an AI agent to generate a response and the AI-integrated glossary engine, utilizing an AI machine learning model, identifies and utilizes domain-specific glossary terms that are unique to the domain in question to generate a response to the query. Moreover, through continuous curation and version control mechanisms, such as generating glossary-refinements, the glossary system evolves and stays up to date with domain-specific glossary terms with definitions that provide proper denotation and connotation of the domain-specific glossary terms, ensuring that AI-generated responses to queries are contextually correct.

Example Systems and Resources

Aspects of the technical solution can be described by way of examples and with reference to FIGS. 1A-1B. FIG. 1A illustrates a cloud computing environment (system) 100, glossary system 100A; AI-integrated glossary resources 120, domain-specific glossary terms data sources 130, AI-integrated glossary 140, glossary service 150, glossary refinement engine 160, machine learning model 162, computing client 170, AI agent 172, glossary service agent 174, AI machine learning model 180, curator client 190, and AI-integrated glossary curator client 192.

The cloud computing system 100 provides a computing environment for implementing glossary system 100A. Glossary system 100A provides glossary terms and their respective definitions for generating responses to queries. The glossary system 100A may be an AI system that can leverage AI in various ways to provide enhanced functionality and provide user with advance tools and features. The glossary system 100A includes AI-integrated glossary engine 100 that provides glossary management for providing contextually correct glossary terms associated with the glossary system 100A.

The AI-integrated glossary engine 110 provides glossary management using AI-integrated glossary resources 120. The AI-integrated glossary resources 120 provide operations, interfaces, and data that enable providing glossary management of the AI-integrated glossary engine 110. Operations can include data ingestion that involves importing information from multiple sources, including the AI-integrated glossary 140 itself and external datasets. Once ingested, the AI-integrated glossary engine 110 processes this data to extract key details such as terms, definitions, synonyms, and relationships. Training machine learning models is another operation, allowing the AI-integrated glossary engine 110 to comprehend the context and semantics of terms within the domain. When users interact with the AI-integrated glossary engine 110, query processing operations facilitate searches and retrieve relevant information. Additionally, user feedback mechanisms enable continuous improvement of search results and recommendations. Interfaces enable user interaction, including a user-friendly interface for term searches, viewing definitions, and providing feedback. APIs enable integration with other systems, while an administrative interface empowers administrators to manage glossary content and system settings. Data encompasses the core glossary information, user interaction data, and parameters/output from machine learning models. By combining these elements, the system aims to deliver accurate, accessible information about domain-specific terms, enhancing knowledge discovery and user experience.

The AI-integrated-glossary 140 is associated with the AI agent 172, and the AI agent 172 supports retrieving a plurality of domain-specific glossary terms from a plurality of data sources to populate the AI-integrated-glossary 140 with the plurality of domain-specific-terms. The AI-integrated glossary engine 110 retrieves a domain-specific glossary term from the AI-integrated-glossary 140. The AI-integrated-glossary 140 is integrated to the AI machine learning model 180 that supports generating the response. The response is generated by the AI machine learning model 180 based on processing the query from the AI agent 172 and executing query understanding operations that support identifying the domain-specific glossary term from the AI-integrated-glossary 140. In some examples, the AI-integrated-glossary 140 is a graph structure comprising one or more glossary-refinements based on an output associated with the AI agent 174.

The domain-specific glossary term is identified using the glossary service 150, which is associated with the AI agent 172 and the AI machine learning model 180. When the AI machine learning model 180 identifies the domain-specific glossary term, the glossary service 150 communicates the domain-specific glossary term to the curator client 190 to cause generation of the response. As such, the curator client 190 accesses the output associated with the response.

In some examples, an interface of the curator client 190 is configured to generate one or more interface elements associated with domain-specific glossary terms of the AI-integrated-glossary 140. For example, the glossary service 150 communicating the domain-specific glossary term to the curator client 190 causes display of the response. Based on causing display of the response, the AI-integrated glossary curator client 192 receives an input based on the domain-specific glossary term. The domain-specific glossary term is caused to be displayed on the curator client 190. Accordingly, the AI-integrated-glossary 140 is associated with a manual curation interface (i.e., the AI-integrated glossary curator client 192) that supports updating the AI-integrated-glossary 140 based on one or more inputs from a user. The glossary-refinement engine 160 generates a glossary-refinement based on the response (i.e., the one or more inputs from the user).

The glossary-refinement engine 160 generates a glossary-refinement associated with the output of the AI-integrated glossary curator client 192, and this output is based on a user interaction with the response from the glossary service 150. The user interaction is logged (e.g., saved) by the glossary-refinement engine 160 to enable generating the glossary-refinement (e.g., at a later time). The glossary-refinement is integrated by the glossary-refinement engine 160 as a metadata entry associated with the domain-specific glossary term. Furthermore, the glossary-refinement engine 160 updates the AI-integrated-glossary 140 based on the glossary-refinement.

Accordingly, the computing client 170 can communicate a query from the AI agent 172 via glossary service agent 174. Based on communicating the query, the AI-integrated glossary engine 110 receives a response associated with the query. The response is generated by an AI machine learning model 180 based on a domain-specific glossary term from the AI-integrated-glossary 140. The glossary service 150 communicates the response back to the AI-agent to cause the computing client 170 to display of the response, causing, in some examples, display of one or more metadata items associated with the domain-specific glossary term.

Figure 2:
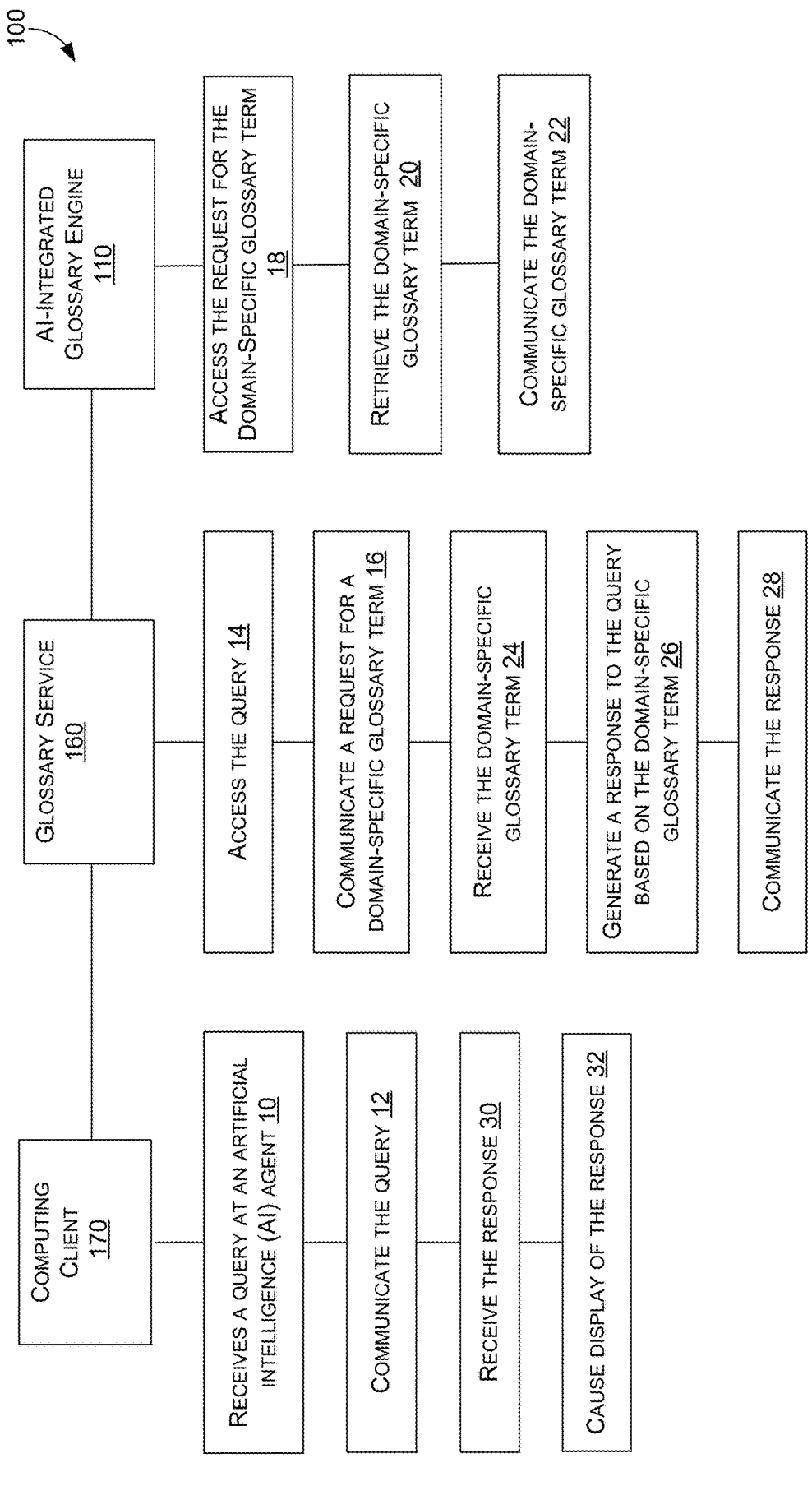
FIG. 2 is a first flow diagram associated with an exemplary glossary system including an AI-integrated glossary engine, in accordance with aspects of the technology described herein.

With reference to FIG. 2, FIG. 2 illustrates a cloud computing system 100 having computing client 170, glossary service 150, and AI-integrated glossary engine 110. At block 10, the computing client 170 receives a query at an AI agent 10; and at block 12, communicates the query.

At block 14, the AI machine learning model 180 accesses the query; and at block 16, communicates a request for a domain-specific glossary term. At block 18, the AI-integrated glossary engine 110 accesses the request for the domain-specific glossary term; at block 20, retrieves the domain-specific glossary term; and at block 22, communicates the domain-specific glossary term.

At block 24, the AI machine learning model 180 receives the domain-specific glossary term; at block 26, generates a response to the query based on the domain-specific glossary term; and at block 28, communicating the response. At block 30, the computing client 170 receives the response; and at block 32, causes display of the response.

Aspects of the technical solution have been described by way of examples and with reference to FIGS. 1A, 1B, and 2. FIG. 1A is a block diagram of an exemplary technical solution environment, based on example environments described with reference to FIGS. 6, 7 and 8 for use in implementing embodiments of the technical solution are shown. Generally the technical solution environment includes a technical solution system suitable for providing the example cloud computing system 100 in which methods of the present disclosure may be employed. In particular, FIG. 1A illustrates a high level architecture of the cloud computing system 100 in accordance with implementations of the present disclosure, among other engines, managers, generators, selectors, or components not shown (collectively referred to herein as "components").

Example Methods

Figure 3:
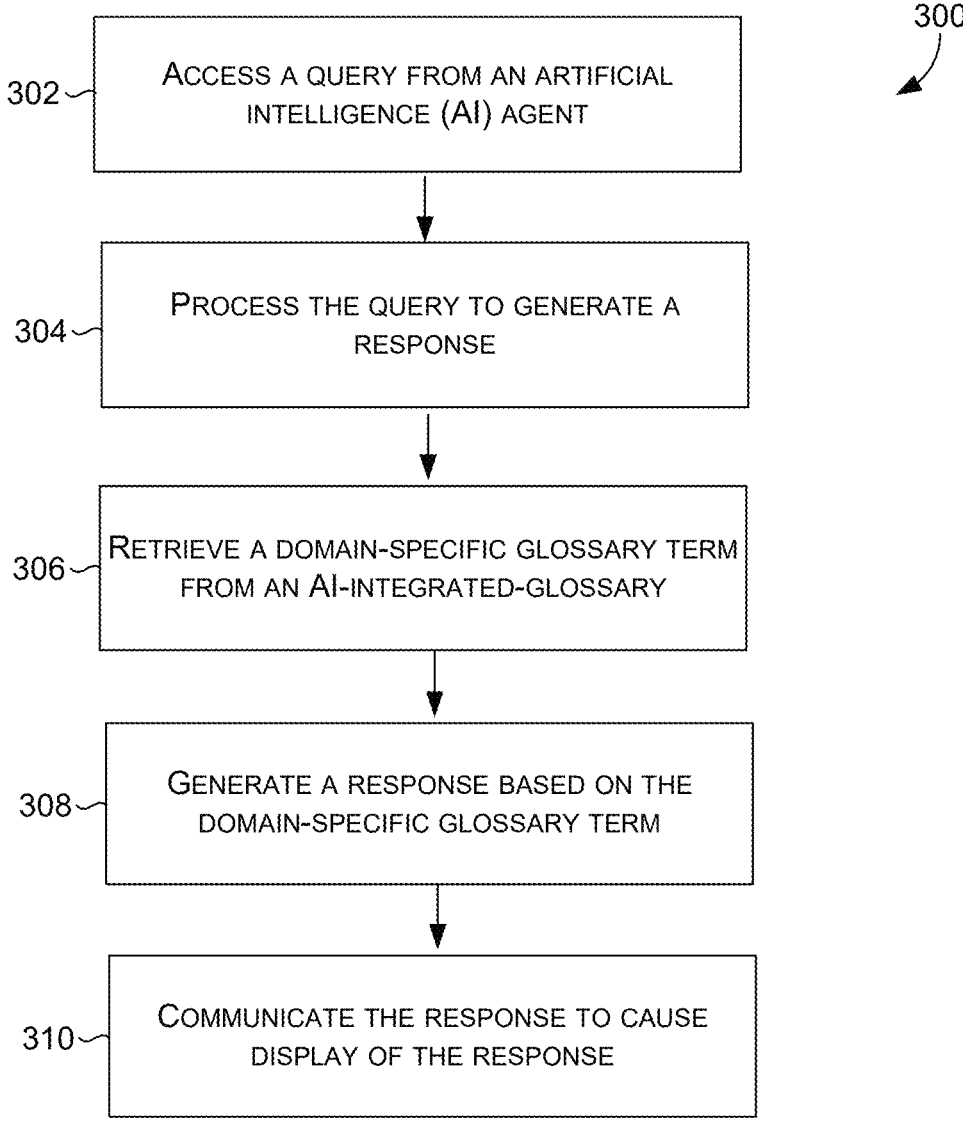
FIG. 3 provides a first exemplary method of providing glossary management using an AI-integrated glossary engine, in accordance with aspects of the technology described herein.

With reference to FIGS. 3, 4, and 5, flow diagrams are provided illustrating methods for providing glossary management using an AI-integrated glossary engine in a glossary system. The methods may be performed using the design system described herein. In embodiments, one or more computer-storage media having computer-executable or computer-useable instructions embodied thereon that, when executed, by one or more processors can cause the one or more processors to perform the methods (e.g., computer-implemented method) in the design system (e.g., a computerized system).

Turning to FIG. 3, a flow diagram is provided that illustrates a method 300 for providing glossary management using an AI-integrated glossary engine in a glossary system. At block 302, access a query from an artificial intelligence (AI) agent. At block 304, process the query to generate a response. At block 306, using a glossary service to retrieve a domain-specific glossary term from an AI-integrated glossary. At block 308, generate a response based on the domain-specific glossary term. At block 310, communicate the response to cause display of the response.

Turning to FIG. 4, a flow diagram is provided that illustrates a method 400 for providing glossary management using an AI-integrated glossary engine in a glossary system. At block 402, communicate a query for a client associated with an artificial intelligence (AI) agent. At block 404, based on communicating the query, receive a response associated with the query. The response is generated based on a domain-specific glossary term from an AI-integrated glossary. The AI-integrated-glossary is integrated to a machine learning model that supports generating the response. At block 406, cause display of the response.

Turning to FIG. 5, a flow diagram is provided that illustrates a method 500 for providing glossary management using an AI-integrated glossary engine in a glossary system. At block 502 access an output associated with a domain-specific glossary term from an artificial intelligence (AI)-integrated-glossary. The AI-integrated-glossary is integrated to a machine learning model that supports generating a response. At block 504, generate a glossary-refinement associated with the output. At block 506, update the AI-integrated-glossary based on the glossary-refinement.

Technical Improvement

Embodiments of the present techniques have been described with reference to several inventive features (e.g., operations, systems, engines, and components) associated with a glossary system. Inventive features described include: operations, interfaces, data structures, and arrangements of computing resources associated with providing the functionality described herein relative with reference to an AI-integrated glossary engine. Functionality of the embodiments of the present invention have further been described, by way of an implementation and anecdotal examples—to demonstrate that the operations for providing the AI-integrated glossary engine as a solution to a specific problem in device management technology to improve computing operations in glossary systems.

By way of example, the AI-integrated glossary engine supports recommending definitions for terms and phrases associated with a query. In particular, the AI-integrated glossary engine generates domain-specific glossary terms that are specific to a particular field, industry, or area of knowledge. For example, A domain-specific glossary term is a term or phrase with a client-specific definition (e.g., capturing the jargon used internally by a client). A user can provide a query to an AI agent to generate a response and the AI-integrated glossary engine, utilizing a machine learning model, identifies and generates domain-specific glossary terms that are unique to the domain in question and that respond to the query. In this way, through continuous curation and version control mechanisms, such as generating glossary-refinements, the glossary system evolves and stays up to date with domain-specific glossary terms with definitions that provide proper denotation and connotation of the domain-specific glossary terms, ensuring that responses to queries are contextually correct.

Additional Support for Detailed Description

Example Artificial Intelligence (AI) System in a Computing Environment

Figure 6:
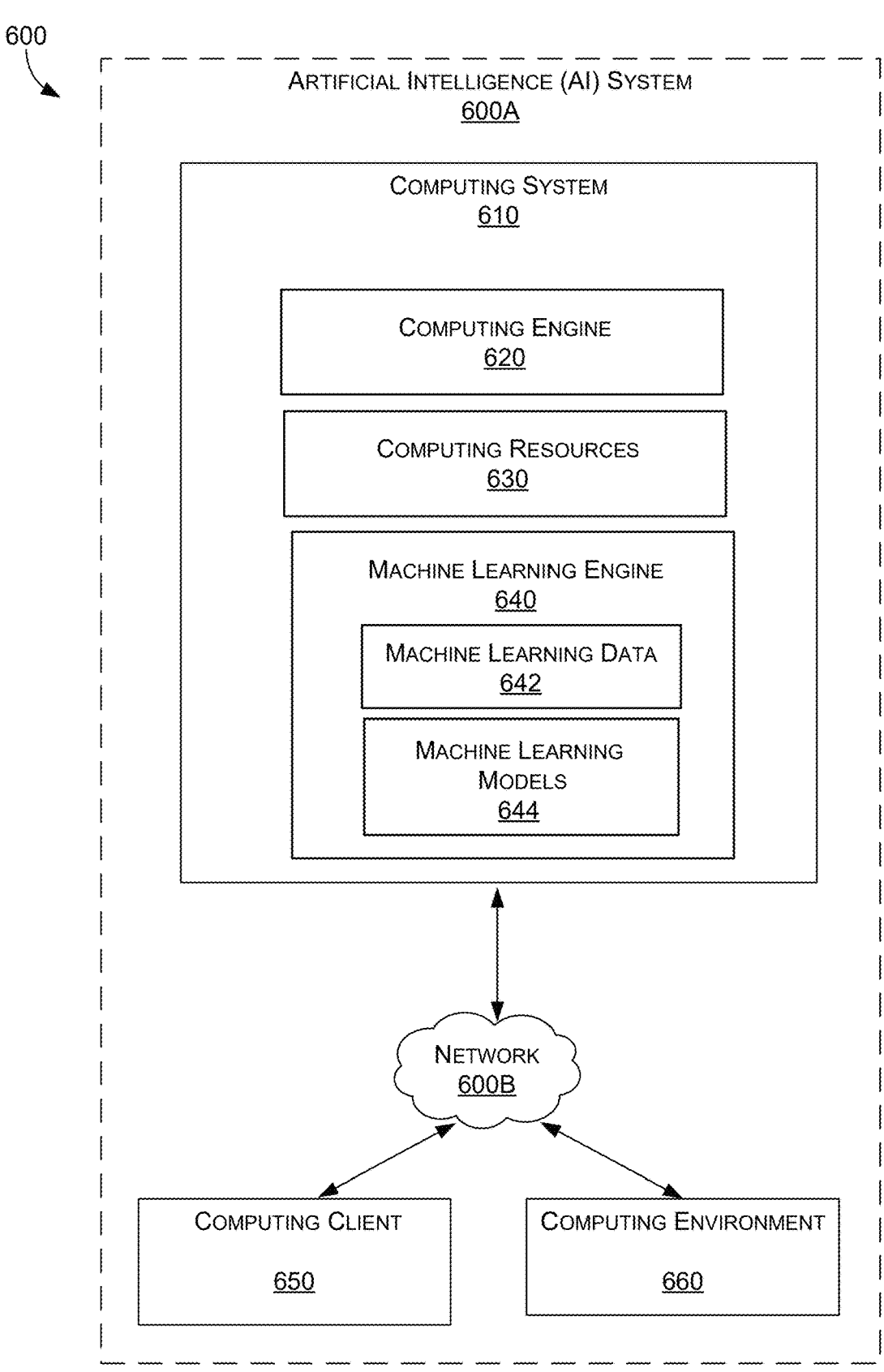
FIG. 6 provides a block diagram of an exemplary computing system suitable for use in implementing aspects of the technology described herein.

Referring now to FIG. 6, FIG. 6 illustrates a computing environment in which implementations of the present disclosure may be employed. In particular, FIG. 6 shows a high level architecture of an example cloud computing platform 600, artificial intelligence (AI) system 600A, and computing system 610 that can host a technical solution environment. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The cloud computing platform 600 provides computing system resources for different types of managed computing environments. For example, the cloud computing platform supports delivery of computing services—including compute, servers, storage, databases, networking, and intelligence. The components of cloud computing environment 600 may communicate with each other over a network 600B which may include, without limitation, one or more local area networks (LANs) and/or wide area networks (WANs).

The AI system 600A provides a specialized infrastructure designed to support the computational demands of artificial intelligence (AI) workloads, including both training and inference tasks. The AI backend network systems 600A consists of interconnected components that facilitate the efficient processing, communication, and management of data within a distributed computing environment. Operations include data processing, handling input data, intermediate results, and output data, alongside complex computations for AI tasks, communication facilitating seamless interaction among components, and resource management overseeing optimal utilization of compute nodes, accelerators (e.g., GPUs, TPUs), memory, and storage. Interfaces encompass network interfaces enabling high-speed communication between nodes, APIs providing standardized interaction methods for developers, and management interfaces for system monitoring and administration. Data support functionalities include storage, data movement, transformation, and replication with backup mechanisms, ensuring data durability and reliability. In this way, the AI backend network system serves as the backbone infrastructure for AI workloads, facilitating efficient and scalable AI processing across distributed computing environments through its comprehensive operations, interfaces, and data management functionalities.

The cloud computing platform 600 provides the foundational infrastructure and resources for deploying and managing computing workloads, including AI. AI system 600A includes specialized infrastructures tailored for supporting the unique computational demands of AI workloads. The relationship between the two involves resource provisioning, integration, orchestration, and data processing, enabling organizations to leverage cloud-based resources effectively for AI development and deployment.

The computing system 610 provides computing functionality for computing environments. For example, the computing system 610 is a platform or framework that leverages advanced technologies such as artificial intelligence (AI), machine learning (ML), data mining, and big data analytics to extract actionable insights and knowledge from large and complex datasets. In this way, the computing system 610 provides a computing environment that enables organizations to make informed decisions and optimize operations.

The computing system 610 includes a computing engine 620 that is a computing environment that supports executing computational tasks associated with the computing system 610. The computing engine 620 can be a hardware or software component that performs computational operations, such as, mathematical calculations, data processing, and algorithm execution. The computing system 610 integrates computing resources 630 into computing engine 610 to effectively provide computing functionality in a computing environment.

The computing resources 630 refer to computing elements (e.g., components, capability, or entities) that collectively enable the computing engine 620 operations. The computing resources 630 encompass a spectrum of computing elements, beginning with the diverse operations the computing resources 630 can perform, ranging from complex computations to data manipulations. Interfaces, an integral part of the computing resources 630, provide the means for both user interaction and seamless integration with external systems, ensuring a dynamic and interactive computing experience. The data facet of the data computing resources 630 involves various types: input data, which is the information provided for processing; processing data, representing the data manipulated during computational tasks; and output data, the results generated by the computing engine 620. In this way, the computing resources 630 support the broader computing engine 620 and computing system 610.

Machine learning engine 640 is a machine learning framework or library that operates as a tool for providing infrastructure, algorithms, capabilities for designing, training, and deploying machine learning models. The machine learning engine 640 can include pre-built functions and APIs that enable building and applying machine learning techniques. The machine learning engine 140 can provide a machine learning workflow from data processing and feature extraction to model training, evaluation, and deployment.

Machine learning data 642 refers to the structured or unstructured information used to train, validate, and test machine learning models. This machine learning data 642 typically comprises input features (also known as independent variables or predictors) and their corresponding target values (also known as dependent variables or labels). Machine learning data 642 can come from various sources, such as databases, sensor readings, text documents, images, audio recordings, or streaming data sources. Machine learning data 642 may require preprocessing, cleaning, and transformation to ensure its suitability for training machine learning models. Additionally, machine learning data 642 is often divided into training, validation, and testing sets to assess the performance and generalization ability of trained models accurately.

Machine learning models 644 are algorithms or mathematical representations that learn patterns and relationships from the provided data to make predictions or decisions without being explicitly programmed. Machine learning models 644 models are trained using the machine learning data 642, where they iteratively adjust their internal parameters or coefficients to minimize prediction errors or maximize performance metrics. Machine learning models 644 can be classified into various types based on their learning algorithms and the nature of the problem they address, including supervised learning models (e.g., regression, classification), unsupervised learning models (e.g., clustering, dimensionality reduction), and reinforcement learning models. Once trained, machine learning models 644 can be deployed in production environments to make predictions on new, unseen data instances. Regular evaluation and monitoring of model performance are essential to ensure their accuracy, reliability, and effectiveness in real-world applications.

The computing client 650 supports access to computing system 610. The computing client 650 can be provided as a user client or an administrator client to support user and administrator functionality associated with the computing environment 660, computing engine 620, or computing system 610. The computing client 650 can also support accessing computing visualizations and causing display of the computing visualization. The computing client 650 can include a computing engine client that supports receiving computing information associated computing engine 620 output from the computing system 610 and causing presentation of the computing information. The computing information can specifically include computing visualizations associated with the computing engine 620 output.

Computing environment 660 is a computing environment that is integrated into the computing system 610. The computing environment 660 is characterized by an infrastructure, where data from various sources within the ecosystem, including servers, networks, applications, sensors, and user interactions, can be aggregated and processed by the computing system 610 to perform computing tasks. The computing environment 660 can be associated with middleware and integration layers facilitate seamless data flow, while computing infrastructure, encompassing cloud-based resources, distributed computing frameworks, and optimized storage systems, supports functionality associated with the computing.

Example Distributed Computing System Environment

Figure 7:
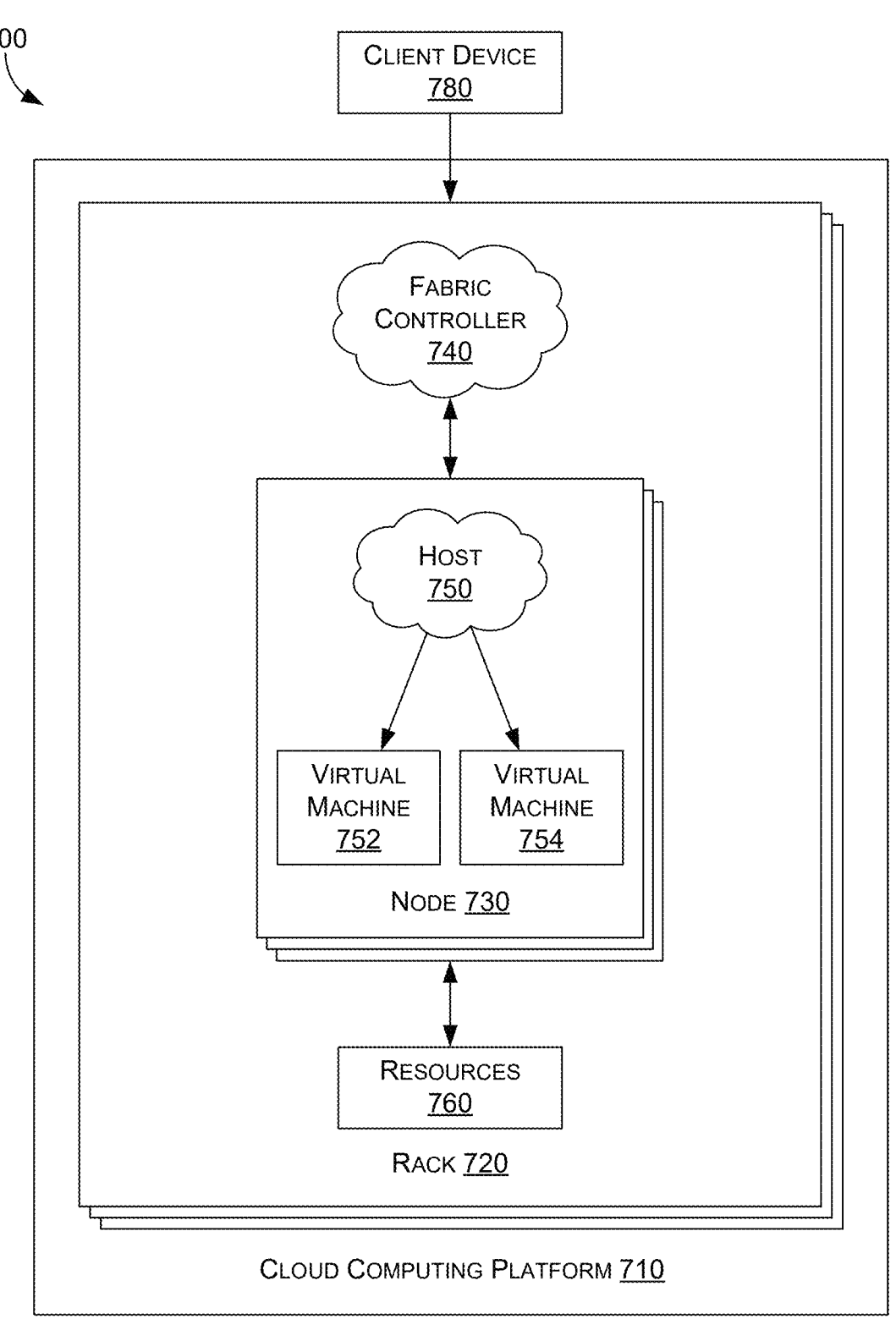
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack

720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Computing Environment

Figure 8:
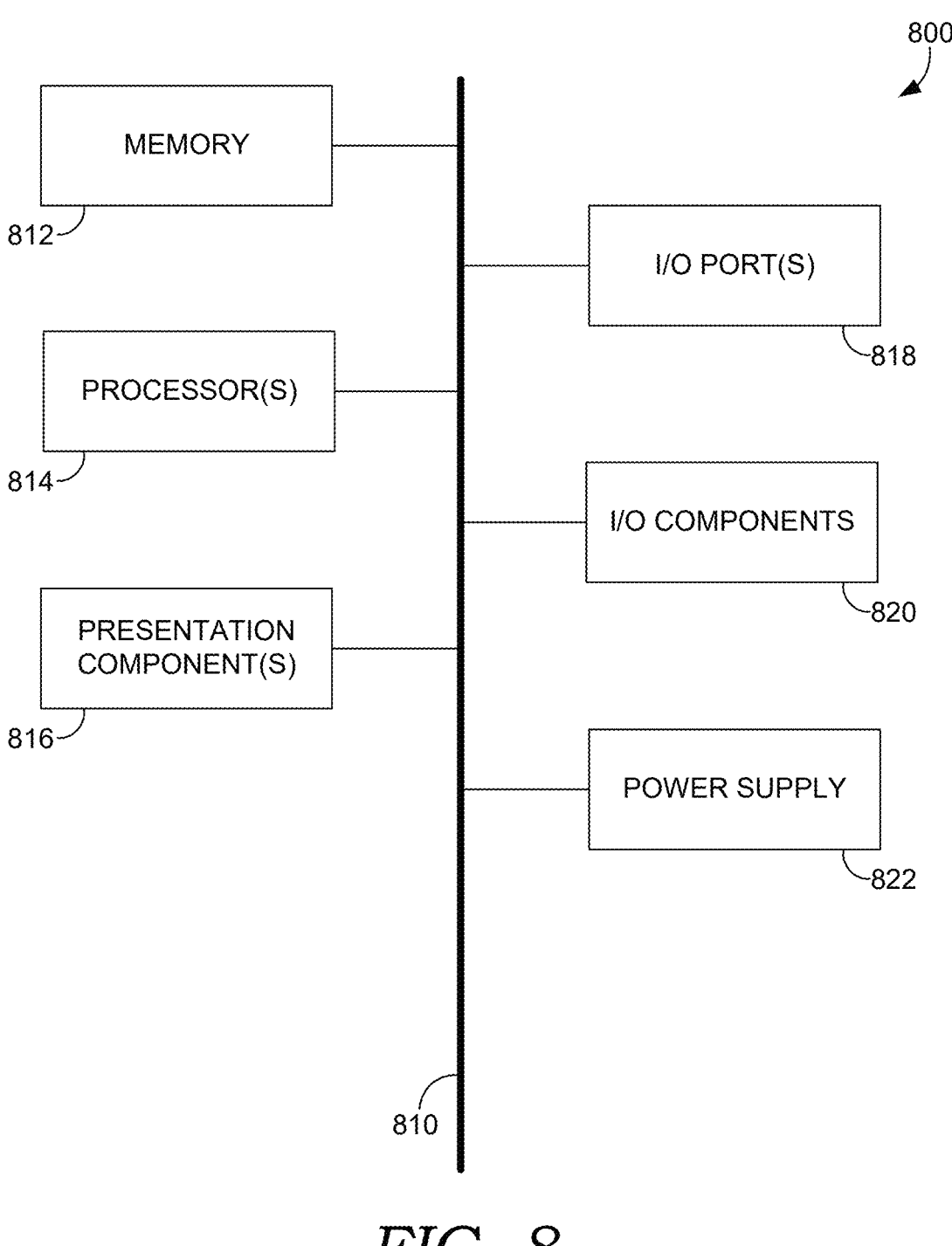
FIG. 8 provides a block diagram of an exemplary computing environment suitable for use in implementing aspects of the technology described herein.

Having briefly described an overview of embodiments of the present technical solution, an example operating environment in which embodiments of the present technical solution may be implemented is described below in order to provide a general context for various aspects of the present technical solution. Referring initially to FIG. 8 in particular, an example operating environment for implementing embodiments of the present technical solution is shown and designated generally as computing device 800. Computing device 800 is but one example of a suitable computing environment and is not intended to suggest any limitation as to the scope of use or functionality of the technical solution. Neither should computing device 800 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present technical solution. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Structural and Functional Features

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

For purposes of this disclosure the word "support" refers to provisioning of functionality, services, or assistance by a computing component or through computing operations within a broader computing system. When a computing component or set of operations supports a specific functionality, it means that it plays a role in enabling or executing that particular aspect of the computing system. This support can manifest in various ways, including the processing of data, execution of operations, management of resources, and ensuring compatibility or interoperability with other components. Additionally, support may involve providing interfaces, APIs (Application Programming Interfaces), or protocols that allow seamless interaction and integration with other elements of the computing system. The concept of support extends beyond mere functionality provision to encompass maintenance, troubleshooting, and the overall optimization of computing resources to ensure the robust and efficient operation of the computing system.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations, the operations comprising:
accessing a query from an artificial intelligence (AI) agent;
processing the query to generate a response;
based on processing the query, using a glossary service to retrieve a domain-specific glossary term from an artificial intelligence (AI)-integrated-glossary, wherein the AI-integrated-glossary is integrated via the glossary service to a machine learning model that supports generating the response based on the domain-specific glossary term from the AI-integrated-glossary;
generating the response based on the domain-specific glossary term; and
communicating the response to cause display of the response.

2. The system of claim 1, wherein processing the response comprises executing query understanding operations that support identifying the domain-specific glossary term from the AI-integrated-glossary.

3. The system of claim 2, the operations further comprising:
based on the query, communicating a request for a domain-specific glossary term; and
retrieving the domain-specific glossary term.

4. The system of claim 3, the operations further comprising:
based on the query, receiving the request for the domain-specific glossary term;
identifying the domain-specific glossary term; and
communicating the domain-specific glossary term to cause generation of the response.

5. The system of claim 1, wherein the AI-integrated-glossary is a graph structure comprising one or more glossary-refinements based on an output associated with the AI agent.

6. The system of claim 1, the operations further comprising:
communicating the query from a client;
based on communicating the query, receiving the response; and
causing display of the response.

7. The system of claim 1, the operations comprising:
accessing an output associated with the response;
generating a glossary-refinement based on the response; and
updating the AI-integrated-glossary based on the glossary-refinement.

8. One or more computer-storage media having computer-executable instructions embodied thereon that, when executed by a computing system having a processor and memory, cause the processor to perform operations, the operations comprising:
communicating, a query from a client associated with an artificial intelligence (AI) agent;
based on communicating the query, receiving a response associated with the query, wherein the response is generated based on a domain-specific glossary term from an artificial intelligence (AI)-integrated-glossary, wherein the AI-integrated-glossary is integrated via the glossary service to a machine learning model that supports generating the response based on the domain-specific glossary term from the AI-integrated-glossary; and causing display of the response to the query.

9. The media of claim 8, wherein an interface of the client is configured to generate one or more interface elements associated with domain-specific glossary terms of an AI-integrated-glossary.

10. The media of claim 8, wherein the response is generated based on processing the query and executing query understanding operations that support identifying the domain-specific glossary term from the AI-integrated-glossary.

11. The media of claim 8, wherein the domain-specific glossary term identified using the glossary service associated with the AI agent and the machine learning model, wherein the machine learning model is a Large Language Model (LLM).

12. The media of claim 8, wherein the AI-integrated glossary is a graph structure comprising one or more glossary-refinements based on an output associated with the AI agent.

13. The media of claim 8, the operations further comprising:

based on causing display of the response, causing display of the domain-specific glossary term; and receiving an input based on the domain-specific glossary term.

14. The media of claim 8, the operations further comprising causing display of one or more metadata items associated with the domain-specific glossary term.

15. A computer-implemented method, the method comprising:

accessing an output associated with a domain-specific glossary term from an artificial intelligence (AI)-integrated-glossary, wherein the AI-integrated-glossary is integrated via the glossary service to a machine learning model that supports generating the response based on the domain-specific glossary term from the AI-integrated-glossary;

generating a glossary-refinement associated with the output; and updating the AI-integrated-glossary based on the glossary-refinement.

16. The method of claim 15, wherein the output is based on a user interaction with response, wherein the user interaction is logged to enable generating the glossary-refinement.

17. The method of claim 15, wherein the glossary-refinement is integrated as metadata entry associated with the domain-specific glossary term.

18. The method of claim 17, wherein the AI-integrated-glossary is a graph structure comprising one or more glossary-refinements based on the output associated with an AI agent.

19. The method of claim 15, wherein the AI-integrated-glossary is associated with a manual curation interface that supports updating the AI-integrated-glossary based on one or more inputs from a user.

20. The method of claim 15, wherein the AI-integrated-glossary is associated with an AI agent that supports retrieving a plurality of domain-specific glossary terms from a plurality of data sources to populate the AI-integrated-glossary with the plurality of domain-specific-terms.

* * * * *